Aug. 13, 1974  J. SPIEGEL ET AL  3,829,348
DECORATIVE THREE-DIMENSIONAL OBJECTS
Filed April 7, 1972  2 Sheets-Sheet 2
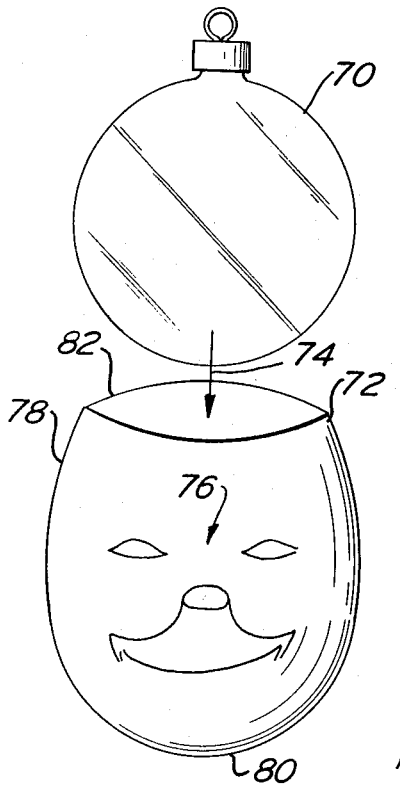
FIG.10
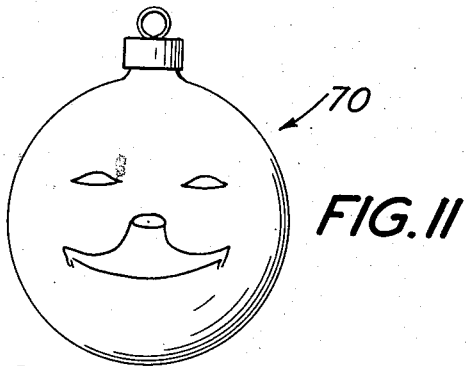
FIG.11
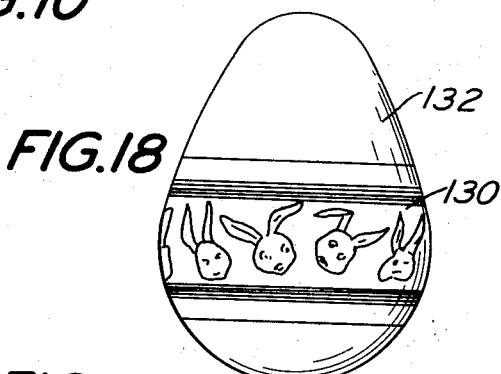
FIG.18
FIG.12
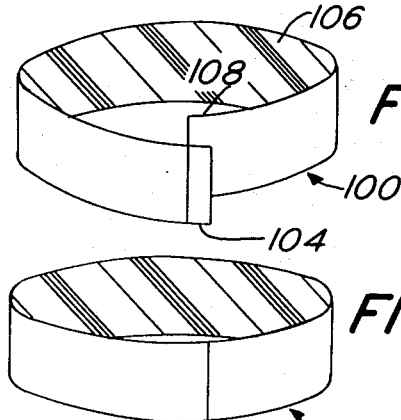
FIG.13
FIG.14
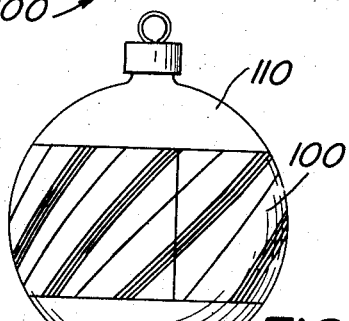
FIG.15
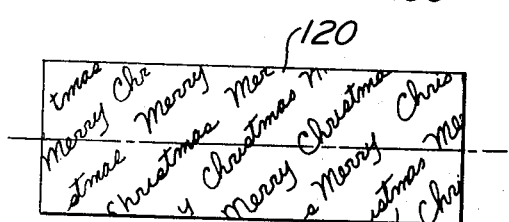
FIG.16
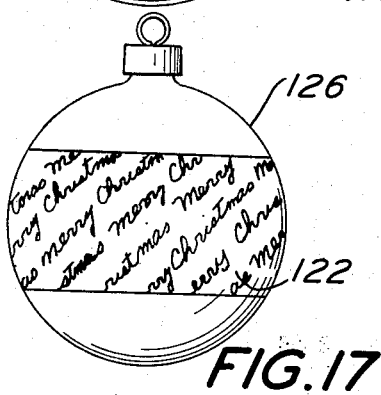
FIG.17

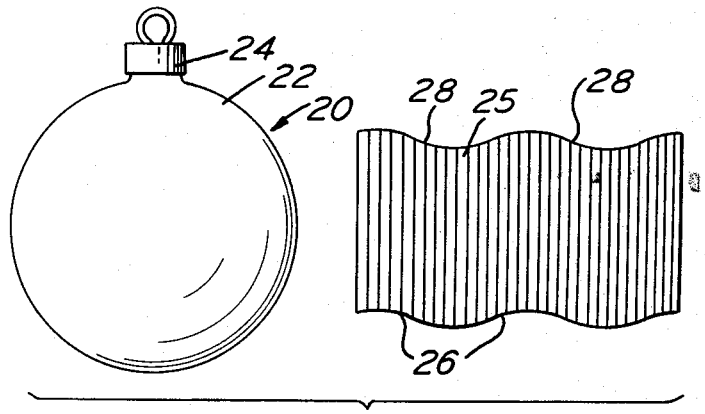
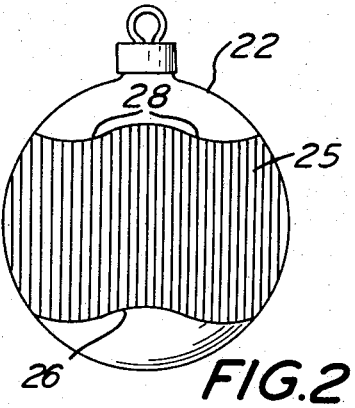
FIG.1  FIG.2
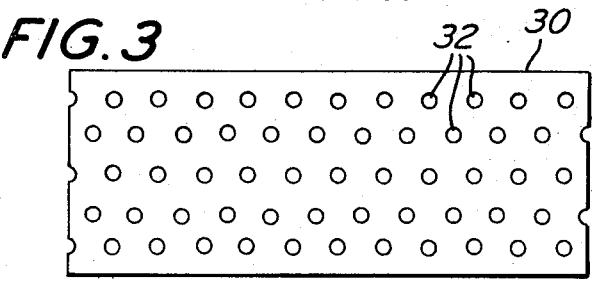
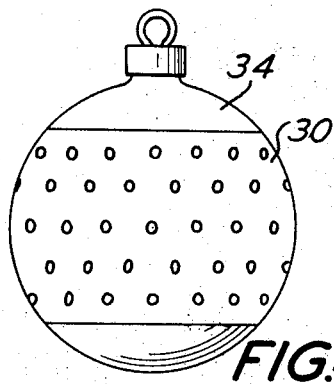
FIG.3  FIG.4
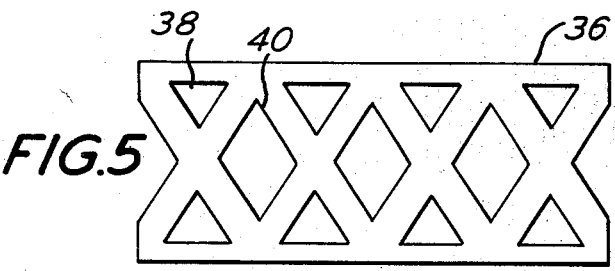
FIG.5
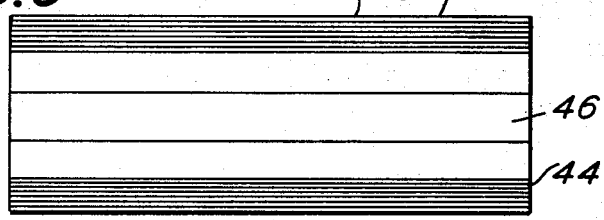
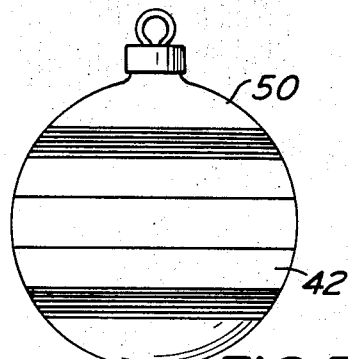
FIG.6  FIG.7
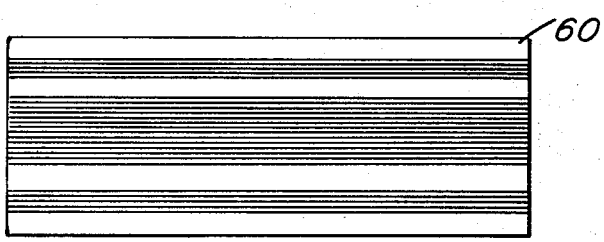
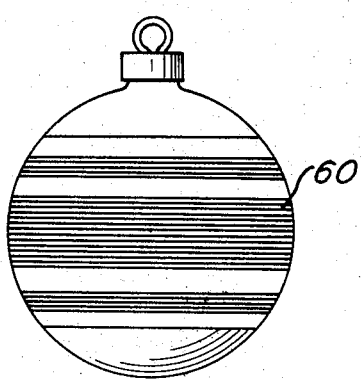
FIG.8  FIG.9

United States Patent Office 3,829,348
Patented Aug. 13, 1974

3,829,348
DECORATIVE THREE-DIMENSIONAL OBJECTS
Jacob Spiegel, Philadelphia, Pa., and Albert R. Miller, Somerdale, N.J.; said Miller assignor to Gilbreth Company, Philadelphia, Pa.
Filed Apr. 7, 1972, Ser. No. 242,050
Int. Cl. A47g 33/08, 33/16; B29c 27/00
U.S. Cl. 161—16　　　　　　　　　　　　　　5 Claims

ABSTRACT OF THE DISCLOSURE

A method of decorating objects rapidly is provided. A band of heat-shrinkable plastic is provided with a decorative pattern and is placed on the object. Heat is applied to the band causing it to shrink and conform to the shape of the object being decorated.

---

This invention relates generally to methods of ornamenting and more particularly to a method for ornamenting spherical, cylindrical and irregularly shaped three-dimensional objects.

Spherical and round objects, due to the problems of handling, are difficult to ornament. For example, round objects as ordinary undecorated Christmas balls, the heads of toys, electric bulbs and similar objects are expensive to ornament in comparison to their cost to manufacture. The decorative patterns are often hand painted, which also requires much labor. Glass Christmas balls are subject to breakage and fracturing during the decorating process. In addition, various irregularly shaped objects, due to their irregular shape, are also difficult and relatively expensive to ornament. Typical items which are difficult to decorate include toys, electric bulbs, glassware, arts and crafts models and other holiday decorations.

It is, therefore, an object of the invention to overcome the conventional disadvantages inherent in decorating spherical and other objects.

Another object of the invention is to provide a new and improved method of ornamenting spherical and other difficult to handle objects.

Yet another object of the invention is to provide a new and improved method of ornamenting toys, electric bulbs, glassware, arts and crafts models and other holiday decorations.

Another object of the invention is to provide intricate or simple heat shrinkable plastic bands with simple or multiple color, decorative patterns for securement to objects by heat shrinking on the object.

Still another object of the invention is to provide decorating means for solid objects such as glass objects, which facilitates handling and takes comparatively little room to store.

These and other objects of the invention are achieved by providing a new and improved method of decorating objects which comprises the steps of providing a heat shrinkable plastic band; providing a decorative pattern on said band; placing the band about the object; and, applying heat to the plastic so that the decorative pattern is secured to the object when said plastic band shrinks to conform to the shape of the object.

Other objects and many of the attendant advantages of this invention will be readily appreciated as the same becomes better understood by reference to the following detailed description when considered in connection with the accompanying drawings wherein:

FIG. 1 is a side elevational view of an undecorated Christmas ball and a heat shrinkable band which has been provided with a decorative pattern;

FIG. 2 is a side elevational view of the Christmas ball of FIG. 1 decorated with said band of heat shrinkable plastic in FIG. 1;

FIG. 3 is a top plan view of a band of heat shrinkable plastic which has been provided with an alternate decorative pattern;

FIG. 4 is a side elevational view of a Christmas ball which has been decorated with said band of heat shrinkable plastic shown in FIG. 3;

FIG. 5 is a fragmentary top plan view of a band of heat shrinkable plastic having a second alternate pattern provided thereon;

FIG. 6 is a top plan view of a strip of heat shrinkable plastic having a third alternate pattern provided thereon;

FIG. 7 is a side elevational view of a Christmas ball decorated by said band shown in FIG. 6;

FIG. 8 is a top plan view of a band of plastic having a fourth alternate pattern provided thereon;

FIG. 9 is a side elevational view of a Christmas ball decorated with said band shown in FIG. 8;

FIG. 10 is a side elevational view of a Christmas ball and a heat shrinkable plastic bag made from a band of heat shrinkable plastic;

FIG. 11 is a side elevational view of the Christmas ball of FIG. 10 decorated with the plastic bag shown in FIG. 10 after the Christmas ball has been inserted in the bag and the bag has been heat shrunk thereon;

FIG. 12 is a top plan view of a strip of heat shrinkable plastic which is used to form a band;

FIG. 13 is a perspective view of the strip of FIG. 12 formed in a loop prior to securement of the ends thereof to form a band;

FIG. 14 is a perspective view of the band formed by the strip shown in FIG. 12;

FIG. 15 is a side elevational view of a Christmas ball decorated by the band shown in FIG. 14;

FIG. 16 is a top plan view of a heat shrinkable plastic band having a repetitive decorative message provided thereon;

FIG. 17 is a side elevational view of a Christmas ball decorated with said band shown in FIG. 16; and FIG. 18 is a side elevational view of a hard boiled egg decorated with a band of heat shrinkable plastic.

Referring now in greater detail to the various figures of the drawing wherein like reference numerals refer to like parts, a non-decorated Christmas ball is shown generally at 20 in FIG. 1.

The Christmas ball 20 basically comprises a substantially spherical bulb of glass 22 and a bracket element 24 which conventionally fits inside the opening of the glass bulb 22 to enable securement thereof to a branch of a Christmas tree.

Also shown in FIG. 1 is a band of heat shrinkable plastic 25 which is preferably comprised polyvinyl chloride. The band is preferably made by providing a seamless transparent tube of heat shrinkable polyvinyl chloride and cutting the tube transversely at spaced longitudinal intervals.

The band 25 in FIG. 1 has been scalloped at 26 along one lateral edge of the strip and at 28 on the other lateral edge of the strip. As will hereinafter be seen in connection with FIGS. 12 through 14, the band is slightly larger in diameter than the diameter of the spherical bulb 22 of the Christmas ball 20.

It should be understood that the band 25 as shown in FIG. 1 is in a flattened state. When the bulb 22 is decorated with the band, the band 25 is opened so that the bulb can be placed therein.

The band of heat shrinkable plastic made from strip 25 is then placed diametrically about the sphere 20 and heat applied to the strip which thereby causes the band to shrink and thereby conform and be secured to the outer surface of the bulb 22 of the Christmas ball 20.

It can, therefore, be seen that a Christmas ball 20 has been decorated very quickly and easily as a result of the heat shrinking of the plastic band 25 about the bulb 22 of the Christmas ball. The offset scalloping of the lateral edges of the strip 25 also provides an undulating ornamental band about the Christmas ball. The band is secured to the ball by the tension of the band after it has been shrunk.

FIGS. 3 and 5 show two alternate manners of providing a decorative pattern on a heat shrinkable band of plastic. In FIG. 3, the band 30 of heat shrinkable plastic is provided with a decorative pattern by prepunching circular openings 32 in an esthetically pleasing pattern through the band 30. The pleasing effect of a band with said openings after it has been heated and secured to the bulb is shown in FIG. 4 wherein band 30 is heat shrunk about a Christmas ball 34. The band is provided on the Christmas ball 34 in the same manner as the band 25 is placed around the bulb 22 of Christmas ball 20 in FIG. 2.

The decorative pattern of band 36 in FIG. 5 is provided by punching out triangular and diamond-shaped openings 38 and 40, respectively, in band 36. In addition to providing decorative patterns by punching openings in the heat shrinkable bands, decorative patterns can be provided on the heat shrinkable bands by silk screening and striping, as shown in FIGS. 6, 8, 12 and 16.

The band 42 shown in FIG. 6 is decorated by striping the band at 44, 46 and 48. FIG. 7 is a side elevational view of a Christmas ball 50 having been decorated by providing the band 42 by heat shrinking on the glass bulb comprising the Christmas ball 50.

Similarly, FIG. 8 shows another form of striping which may be provided to a band 60. FIG. 9 shows a Christmas ball 62 having been decorated with band 60. It should be noted that band 60 is transparent along its top and bottom edges. This enables the top and bottom edges of the band 60 to "disappear" with respect to the bulb. That is, the transparency of the band enables the bulb to be seen through the top and bottom edges of the band.

Referring to FIG. 10, a Christmas ball 70 is shown about to be decorated by a heat shrinkable bag 72 by inserting the ball in the direction of arrow 74 within the bag 72. The bag 72 is preferably formed of a cylindrical band of heat shrinkable plastic which has been suitably decorated by providing a decorative pattern 76 in the heat shrinkable band. The band is then made into the form of a bag by suitably seaming (preferably by heat welding) the band to provide the shape shown in FIG. 10.

That is, bag 72 is formed by having a wide band of heat shrinkable plastic heat welded along a U-shaped seam 78 which forms the edge of the bag 72 and which closes one end 80 of the tube and leaves an opening 82 at the other end. The opening 82 provides an entry port for Christmas ball 70 for insertion in the bag. The bag enables substantially the entire periphery of a spherical object to be decorated in one heating step.

After the ball 70 is placed in bag 72, heat is applied to the bag 72, the bag shrinks to conform to the outer surface of the ball and the Christmas ball 70 is decorated as shown in FIG. 11. The decorative pattern 76 may be provided on the bag 72 not only by printing but also by cut-outs of portions of the heat shrinkable plastic.

An alternate method of forming a band of heat shrinkable plastic is shown in FIG. 12 wherein a strip 100 of clear heat shrinkable thermoplastic material is shown with a striped pattern 102 which extends at a 45° angle with respect to the longitudinal axis of the strip 100. In order to form a band from the strip 100, a blank portion 104 is provided at the end of the strip. The strip 100 is then looped in the fashion shown in FIG. 13 having the decorative pattern 102 provided on the inner surface 106 of the strip 100. Thus, when the blank portion 104 overlaps end 108 of the loop formed of strip 100, the blank surface of portion 104 of the strip is aligned with the unprinted outer surface of the strip 100. The portion 104 is the only portion which overlaps the end 108 and is then heat sealed to the end to form a loop.

The blank portion 104 in combination with the providing of the printed pattern on the inner surface of the loop 100 enables the loop to be formed with a heat sealing operation. Moreover, by providing a blank portion at the end, there is substantially no difference in the density of the pattern at the heat sealed portion. That is, since the strip 100 is made of a clear thermoplastic, there is only a single layer of printing about the 360° of the band. The finished band is shown in FIG. 14 formed from strip 100.

A Christmas ball 110 decorated with band 100 is shown in FIG. 15. The band is placed around the ball and is secured to the ball 110 by providing heat to the band and shrinking the band.

It should be noted, however, as set forth hereinabove, that the decorative heat shrinkable bands are preferably made from seamless transparent tubes of heat shrinkable plastic. The bands are of course formed by cutting the tube transversely at spaced intervals in accordance with the width of the bands.

Another form of decorative pattern that can be provide on the heat shrinkable plastic bands, is a pattern formed of an endless message 120, which is provided on band 122. The band 122, after placement about Christmas ball 126 and heat shrinking thereof, is shown decorating the Christmass ball 126 in FIG. 17.

In addition to Christmas balls, ornamental plastic bands can be utilized to decorate eggs for Easter as shown in FIG. 18 wherein a plastic band 130 having the likeness of a plurality of rabbits printed thereon is used to decorate an Easter egg 132. The band 130 is preferably placed about the largest lateral dimension of the egg and then heat is applied thereto to secure the plastic band to the egg. The plastic band, of course, conforms to the outer surface of the egg and therby quickly and easily decorates the same. In addition to the Christmas balls and eggs, various solid objects can be decorated in a manner similar to that shown with respect to the Christmas balls and the egg.

For example, a glass can be decorated with an intricate pattern by merely providing a suitably ornamented tube of heat shrinkable plastic and heat shrinking the same about the glass. In such a way, sophisticated designs and decorations can be provided in a very inexpensive fashion to difficult to decorate objects.

Moreover, as seen with respect to Christmas ball 70 in FIG. 10, a band may be made in the form of a bag 72 to provide a large area of decoration even about a spherical or oblong object. The face of a doll or its body, for example, can be made by providing a decorated or printed plastic band over the end of a facially structured doll head to produce the various features of a doll.

It should be noted that for decorating Christmas balls and other round or cylindrically shaped objects, it is preferable that the heat shrinkable plastic be made of polyvinyl chloride or polyethylene which is uniaxially oriented. That is, it is preferred that there be a 30% to 50% diameter shrinkage with only a 2% to 10% height shrinkage.

It can, therefore, be seen that a new and improved method of decorating objects has been provided. The heat shrinkable plastic bands are easily provided in place and are then heated to conform to the surface of the object decorated. In the case of spheres, as long as the center of the strip is somewhat aligned with the diameter of the sphere, it is substantially impossible to remove the band from the sphere inadvertently.

It should also be noted that the heat shrinkable plastic bands and bags which may be opaque, clear or translucent can be used with christmas balls that are clear, chromed, opaque or colored. Moreover, the heat shrinkable bands can be decorated by either punching, scalloping or imprinting by silk screening and other printing processes.

Without further elaboration, the foregoing will so fully illustrate our invention that others may, by applying current or future knowledge, readily adapt the same for use under various conditions of service.

What is claimed as the invention is:

1. In combination, an irregularly shaped three-dimensional object having a convex surface, and a decorative band having an inner surface and an outer surface, said band also having a decorative pattern thereon and being disposed about said object to form an ornament, with said inner surface of said band being in intimate contact with said convex surface of said object along the entire inner surface of the band, said band being formed of an uniaxially oriented heat-shrinkable thermoplastic, said band having a thirty percent to fifty percent diameter shrinkage and a two percent to ten percent height shrinkage.

2. The object of Claim 1 wherein said inner surface of said band is in intimate contact with the convex surface of the object, except for only one portion of the convex surface of the object.

3. The object of Claim 1 wherein said object is spherical.

4. The object of Claim 1 wherein said object is egg-shaped.

5. The object of Claim 1 wherein said thermoplastic is selected from the group consisting of polyvinyl chloride and polyethylene.

References Cited

UNITED STATES PATENTS

| | | | |
|---|---|---|---|
| 3,194,959 | 7/1965 | Bashaw et al. | 240—10 R |
| 3,734,273 | 5/1973 | Watanabe | 156—86 UX |
| 3,542,229 | 11/1970 | Beyerlein et al. | 156—86 X |

PHILIP DIER, Primary Examiner

U.S. Cl. X.R.

156—86; 240—10

Dedication 3,829,348.—*Jacob Spiegel*, Philadelphia, Pa. and *Albert R. Miller*, Somerdale, N.J. DECORATIVE THREE-DIMENSIONAL OBJECTS. Patent dated Aug. 13, 1974. Dedication filed July 26, 1982, by the assignee, *Gilbreth International Corp.*

Hereby dedicates to the Public the remaining term of said patent.

[*Official Gazette October 5, 1982.*]